US008566620B2

(12) United States Patent
Russell et al.

(10) Patent No.: US 8,566,620 B2
(45) Date of Patent: Oct. 22, 2013

(54) DATA PROCESSING HAVING MULTIPLE LOW POWER MODES AND METHOD THEREFOR

(75) Inventors: Andrew C. Russell, Austin, TX (US); Ravindraraj Ramaraju, Round Rock, TX (US); Shayan Zhang, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 506 days.

(21) Appl. No.: 12/846,042

(22) Filed: Jul. 29, 2010

(65) Prior Publication Data

US 2012/0030482 A1    Feb. 2, 2012

(51) Int. Cl.
*G06F 1/00* (2006.01)

(52) U.S. Cl.
USPC .......................................... 713/300; 713/310

(58) Field of Classification Search
USPC .................................. 713/300–340
See application file for complete search history.

(56) References Cited

U.S. PATENT DOCUMENTS

| | | | |
|---|---|---|---|
| 6,560,139 B2 | 5/2003 | Ma et al. | |
| 7,039,818 B2 * | 5/2006 | Deng et al. | 713/320 |
| 7,126,861 B2 | 10/2006 | Hose, Jr. et al. | |
| 7,363,523 B2 * | 4/2008 | Kurts et al. | 713/320 |
| 7,453,743 B2 * | 11/2008 | Houston | 365/189.09 |
| 7,523,373 B2 | 4/2009 | Russell et al. | |
| 7,630,270 B2 * | 12/2009 | Ko et al. | 365/227 |
| 7,650,524 B2 * | 1/2010 | Frederick et al. | 713/500 |
| 7,715,221 B2 * | 5/2010 | Christensen et al. | 365/154 |
| 7,804,329 B2 * | 9/2010 | Cho et al. | 326/83 |
| 8,156,357 B2 * | 4/2012 | Zhang et al. | 713/320 |
| 8,248,867 B2 * | 8/2012 | Mikan et al. | 365/189.14 |
| 2012/0179923 A1 * | 7/2012 | Sasaki et al. | 713/300 |

OTHER PUBLICATIONS

U.S. Appl. No. 12/786,916, filed May 25, 2010.
Wang et al.; "A 1.1Ghz 12 uA/Mb-Leakage SRAM Design in 65 nm Ultra-Low-Power CMOS Technology With Integrated Leakage Reduction for Mobile Applications"; IEEE Journal of Solid-State Circuits; Jan. 2008; pp. 172-179; vol. 43, No. 1; IEEE.

* cited by examiner

*Primary Examiner* — Tim Vo
*Assistant Examiner* — Trisha Vu
(74) *Attorney, Agent, or Firm* — Joanna G. Chiu; Daniel D. Hill (57) ABSTRACT

A method is provided for operating a data processing system having a memory. The memory is coupled between a first power supply voltage terminal for receiving a first variable potential and a second power supply voltage terminal for receiving a second variable potential. An initial difference between the first variable potential and the second variable potential is not less than a first voltage. The method comprises: receiving a command to transition the data processing system from a first power supply voltage to a second power supply voltage; changing the second variable potential so that a difference between the second variable potential and the first variable potential is greater than the first voltage; and after changing the second variable potential, changing the first variable potential, wherein a difference between the first variable potential and the second variable potential is not less than the first voltage.

20 Claims, 4 Drawing Sheets

| Vdd_reg | Vss_reg | MODE (DISABLE, FLOAT, Sel 0, Sel 1) |
|---|---|---|
| 1.0V | 300mV | 0 0 0 0 - LOW POWER MODE 1 WITH STATE RETENTION |
| 0.9V | 200mV | 0 0 0 1 - LOW POWER MODE 2 WITH STATE RETENTION |
| 0.8V | 100mV | 0 0 1 1 - LOW POWER MODE 3 WITH STATE RETENTION |
| 0.7V | 0V | 1 0 X X - LOW POWER MODE 4 WITH STATE RETENTION |
| 0.6V | FLOAT | 0 1 X X - LOW POWER MODE WITHOUT STATE RETENTION |

DATA PROCESSING HAVING MULTIPLE LOW POWER MODES AND METHOD THEREFOR

BACKGROUND

1. Field

This disclosure relates generally to data processing systems, and more specifically, to a data processing having multiple low power modes.

2. Related Art

Static leakage power has become a significant portion of the power consumption of very large scale system-on-a-chip (SoC) integrated circuits. Reducing leakage current is becoming an increasingly important factor in extending battery life of, for example, handheld devices.

Most circuits in handheld devices are typically off, for example, in an idle or deep sleep mode, for a significant portion of time, consuming only leakage power. As transistor leakage currents increase with finer geometry manufacturing processes, it becomes more difficult to meet chip leakage targets using traditional power reduction techniques.

There are several methods for reducing leakage currents of integrated circuits during a low power mode. One method involves providing a regulated ground terminal that can be at ground potential during a normal operating mode and then increased above ground during a low power operating mode to reduce the leakage current. However, a minimum data retention voltage must be maintained when reducing the power supply voltage to cache memories of the system to avoid corruption of stored data.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a data processing system having a processor and at least one memory. The data processing system utilizes dynamic voltage scaling (DVS) to reduce the power consumption of processors by scaling the operating voltage in accordance with performance needs. For example, when high performance is needed, the processor can operate at a higher voltage and when less performance is needed, the processor can operate at a lower voltage. Therefore, DVS can be used to allow the processor to operate in various different low power modes. Also, the memory is capable of having its ground terminal regulated such that it can be at ground potential during a normal operating mode and then increased above ground during a low power operating mode to reduce the leakage current. Therefore, in one embodiment, the memory is powered by a first power supply terminal and a second power supply terminal, and the processor is powered by the first power supply terminal and a third power supply terminal in which the second supply terminal is at a same or higher potential than the third supply terminal, and first supply terminal is at a higher potential than the second supply terminal. Each of the first and the second power supply terminals are capable of receiving a variable potential. For example, upon transitioning the processor between low power modes, the potential of the first supply terminal is scaled accordingly. Also, the potential of the second supply terminal can be regulated such that it can be at the same potential as the third supply terminal during a normal operating mode and then increased above the potential of the third supply terminal to various different levels during different low powers mode in order to reduce the leakage current. However, when transitioning between low power modes, care is needed to ensure that the minimum state retention voltage of the memory is maintained. That is, the voltage difference between the first supply terminal and the second supply terminal should be maintained at least above the minimum state retention voltage of the memory, if possible, in order to prevent the loss of data within the memory. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
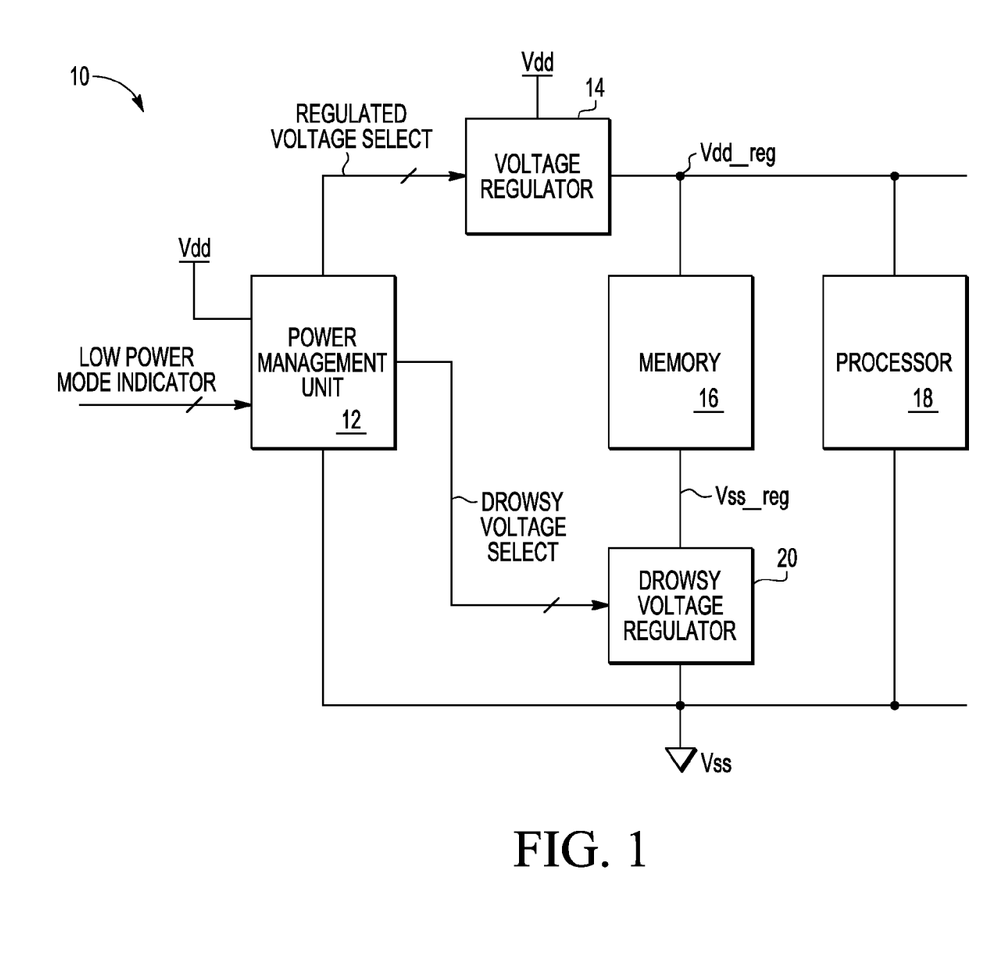
FIG. 1 illustrates, in block diagram form, a data processing system in accordance with an embodiment.

FIG. 1 illustrates, in block diagram form, a simplified view of a data processing system 10 in accordance with an embodiment. In one embodiment, data processing system 10 can be located on a single integrated circuit. Data processing system 10 can be any type data processing system, such as for example, a microcontroller, a microprocessor, or a digital signal processor (DSP). Data processing system 10 includes a plurality of circuit blocks such as a memory 16, a processor 18, a voltage regulator 14, a drowsy voltage regulator 20, and a power management unit 12. To simplify the block diagram of data processing system 10, interconnections between the circuit blocks have been left out. Also, other embodiments of data processing system 10 may have more, fewer, or different blocks. Memory 16 is coupled to a first power supply terminal which receives a regulated power supply voltage, Vdd_reg. Memory 16 is also coupled to a second power supply terminal which receives a regulated power supply voltage, Vss_reg. In one embodiment, memory 16 is a static random access memory (SRAM) having an array of SRAM memory cells. Processor 18 is coupled to the first power supply terminal and is coupled to a third power supply terminal which is coupled to ground (i.e. Vss). Voltage regulator 14 is coupled to a fourth power supply terminal which receives a power supply voltage, Vdd. Drowsy voltage regulator 20 is coupled to the second power supply terminal and the third power supply terminal. Power management unit 12 is coupled to the fourth power supply terminal (e.g. to receive Vdd) and the third power supply terminal (e.g. to ground). Power management unit 12 provides a regulated voltage select signal to voltage regulator 14 and a drowsy voltage select signal to drowsy voltage regulator 20. Power management unit 12 also receives a low power mode indicator, which, in one embodiment, is generated by processor 18, or alternatively, may be generated elsewhere within data processing system 10. In another embodiment, low power mode indicator may be an internal signal generated and used within power management unit 12.

Data processing system 10 is capable of operating in various different low power modes. In one embodiment, low power mode indicator indicates to power management unit 12 a selected low power mode, and power management unit 12 provides information to voltage regulator 14 and drowsy voltage regulator 20 to appropriately transition to the indicated low power mode. For example, referring to the table of FIG. 3, 5 different low power modes are illustrated in which the first 4 allow for state retention and the fifth one does not. For the description of the FIGs. herein, it is assumed that the minimum state retention voltage of memory 16 is 0.7 V. Therefore, in order for state to be maintained, the voltage across memory 16 should be at least 0.7 V. As seen in the first row of the table of FIG. 3, a first power mode scales Vdd to 1.0V. As seen in the second row of the table, a second power mode scales Vdd to 0.9. As seen in the third row, a third power mode scales Vdd to 0.8V. As seen in the fourth row, a fourth power mode scales Vdd to 0.7V, and as seen in the fifth row, a fifth power mode scales Vdd to 0.6V. Therefore, depending on the selected low power mode based on the low power mode indicator, power management unit 12 provides the regulated voltage select signal to indicate the selected regulated value of Vdd. For example, if the second mode is indicated, power management unit 12 indicates to voltage regulator 14, via the regulated voltage select signal, that the selected target value for Vdd_reg to be output by voltage regulator 14 is 0.9V. Any known voltage regulator circuit may be used to implement voltage regulator 14 which provides Vdd_reg based on Vdd received by voltage regulator 14.

Figure 2:
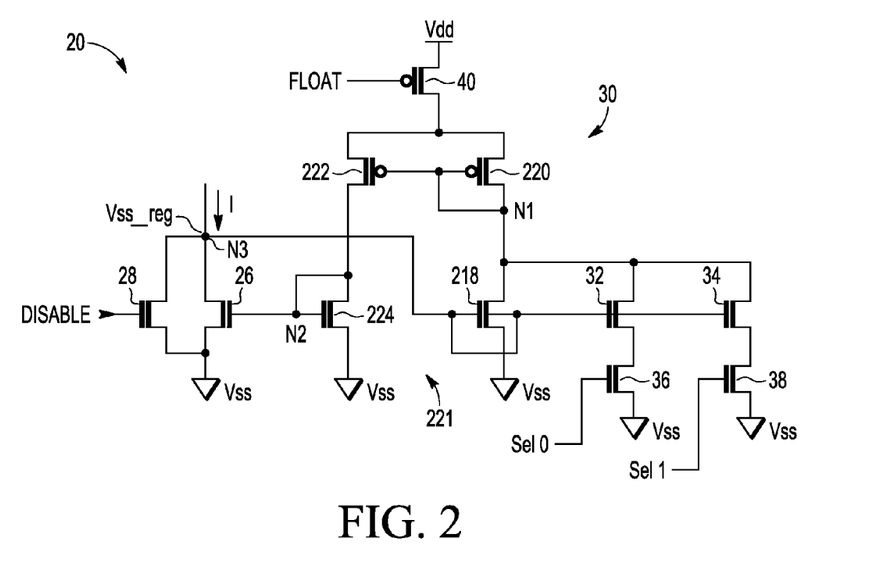
FIG. 2 illustrates, in schematic diagram form, a drowsy voltage regulator of the data processing system of FIG. 1, in accordance with one embodiment.
Figure 3:
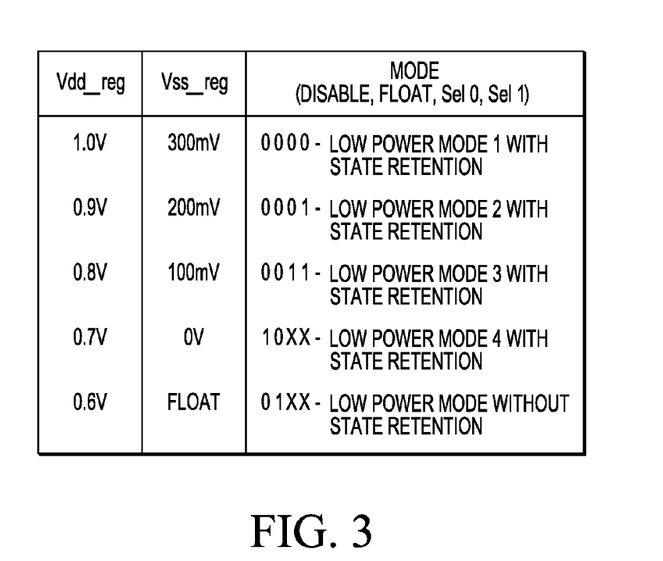
FIG. 3 illustrates a table of low power modes of the data processor of FIG. 1, in accordance with one embodiment.

During many of the low power modes, such as low power modes 1-3 of FIG. 3, drowsy voltage regulator 20 regulates Vss to provide Vss_reg such that Vss_reg is greater than Vss, in order to reduce the leakage current of memory 16. However, the values of Vss_reg are selected such that the voltage difference seen by memory 16 (Vdd_reg minus Vss_reg) is still at least as great as the minimum state retention voltage required to retain the state of memory 16. Therefore, if Vdd_reg is 1.0V, Vss_reg can be regulated to 300 mV. Referring to the table of FIG. 3, if Vdd_reg is 0.9V, Vss_reg can be regulated to 200 mV, and if Vdd_reg is 0.8V, Vss_reg can be regulated to 100 mV. However, if Vdd_reg is 0.7V, drowsy voltage regulator 20 is disabled such that Vss_reg is set to Vss (i.e. 0V) by, for example, directly coupling the second power supply terminal to the third power supply terminal, as will be seen in reference to FIG. 2. Drowsy voltage regulator 20 is disabled because Vss_reg needs to be 0V when Vdd_reg is 0.7V in order to maintain state. When Vdd_reg is 0.6V, the voltage that can be seen by memory 16, even with drowsy voltage regulator 20 disabled such that Vss_reg is 0V, is only 0.6, which is not sufficient, in this example, to retain state. Therefore, in this case, the second power supply terminal can be set to float such that Vss_reg is an indeterminate value. In this low power mode, there is no state retention. Therefore, depending on the selected low power mode based on the low power mode indicator, power management unit 12 provides the drowsy voltage select signal to indicate the selected regulated value of Vss_reg. For example, if the second mode is indicated, power management unit 12 indicates to voltage regulator 14, via the regulated voltage select signal, that the selected target value for Vdd_reg to be output by voltage regulator 14 is 0.9V and indicates to drowsy voltage regulator 20, via the drowsy voltage select signal, that the corresponding selected target value for Vss_reg to be output by drowsy voltage regulator 20 is 200 mV. An example of drowsy voltage regulator 20 is provided in FIG. 2. In one embodiment, as will be described below in reference to FIG. 2, drowsy voltage select signal is a four-bit signal which includes a disable indicator bit, a float indicator bit, and one or more select bits (e.g. sel0 and sel1) which allow the selection of various different low power modes.

In an alternate embodiment, rather than raise Vss_reg to be above Vss in order to reduce the memory leakage when not being accessed, the Vdd to the memory is reduced to below Vdd_reg to lower the memory leakage. In such an implementation, drowsy voltage regulator 20 is coupled to the first power supply terminal and a fifth power supply terminal which receives a regulated power supply voltage Vdd_mem and memory 16 is coupled to the fifth power supply terminal and the third power supply terminal which is coupled to ground. During various low power modes, drowsy voltage regulator 20 regulates Vdd_reg to provide Vdd_mem such that Vdd_mem is less than Vdd_reg, in order to reduce the leakage current of memory 16. The values of Vdd_mem may be selected such that the voltage difference seen by memory 16 (e.g., Vdd_mem minus Vss) is greater than or equal to the minimum state retention voltage required to retain the state of memory 16.

FIG. 2 illustrates, in schematic form, an example of drowsy voltage regulator 20. Regulator 20 includes disable transistor 28, regulating transistor 26, and bias circuit 30. Bias circuit 30 includes sensing transistor 218, load transistor 220, transistors 222, 224, and 40. Transistors 222 and 224 are coupled together to form an inverting stage 221. Bias circuit 30 also includes transistors 32, 34, 36, and 38. Transistors 26, 28, 218, 224, 32, 34, 36, and 38 are N-type MOS (metal oxide semiconductor) transistors and transistors 220, 222, and 40 are P-type MOS transistors implemented on an integrated circuit. In one embodiment, voltage regulator 20 is implemented using CMOS (complementary metal-oxide semiconductor) transistors on a silicon-on-insulator (SOI) substrate. In other embodiments, voltage regulator 20 can be implemented on another type of substrate using a different transistor type.

Any type of circuit that would benefit from leakage reduction during low power mode can be coupled to internal node N3. For example, the circuit can be one or more logic circuits or a plurality of memory cells, or a combination of logic and memory. In one embodiment, such as in the example of FIG. 1, memory 16, which may be an array of static SRAM cells, is coupled to node N3 which is also the second power supply terminal, Vss_reg, for memory 16. A leakage current labeled "l" will be present when memory 16 is in a low power mode. During low power mode, the voltage at the Vss_reg terminal is increased above ground to reduce the leakage current from memory 16.

Disable transistor 28 has a first current electrode connected to node N3, a control electrode connected to receive a disable signal, DISABLE, and a second current electrode connected to power supply terminal Vss. Sensing transistor 218 has a first current electrode connected to a node N1, a control electrode and a body terminal both connected to node N3, and a second current electrode connected to Vss. Transistor 40 has a first current electrode coupled to the power supply terminal Vdd, a second current electrode, and a control electrode connected to receive a float signal, FLOAT. Load transistor 220 has a first current electrode connected to the second current electrode of transistor 40, a control electrode and a second current electrode both connected to the first current electrode of transistor 218 at node N1. P-channel transistor 222 has a first current electrode connected to the second current electrode of transistor 40, a control electrode connected to the control electrode of transistor 220, and a second current electrode. Transistor 224 has a first current electrode connected to the second current electrode of transistor 222, a control electrode connected to the second current electrode of transistor 222, and a second current electrode connected to Vss. Regulating transistor 26 has a first current electrode connected to the first current electrode of transistor 28, a control electrode connected to the control electrode of transistor 224 at node N2, and a second current electrode connected to VSS. The body terminals (not shown) of N-channel transistors 26, 28, and 224 are connected to VSS and the body terminals (not shown) of P-channel transistors 220 and 222 are connected to VDD. Transistor 32 has a first current electrode connected to node N1, a control electrode connected to the control electrode of transistor 218, and a second current electrode. Transistor 34 has a first current electrode connected to node N1, a control electrode connected to the control electrode of transistor 218, and a second current electrode. Transistor 36 has a first current electrode connected to the second current electrode of transistor 32, a second current electrode connected to Vss, and a control electrode coupled to receive sel0. Transistor 38 has a first current electrode connected to the second current electrode of transistor 34, a second current electrode connected to Vss, and a control electrode coupled to receive sel1.

During a normal mode of operation, memory 16 (FIG. 1) is active and receives a normal operating power supply voltage at Vdd. Disable signal DISABLE is asserted as a logic high to make transistor 28 conductive, thus connecting node N3 to Vss so that node N3 is at substantially Vss. Transistors 218, 32, and 34 is substantially non-conductive as node N3 is at substantially Vss potential. Float signal FLOAT is negated as a logic low to make transistor 40 conductive. Node N1 is at Vdd potential so that transistors 220 and 222 are substantially non-conductive. Node N2 is at Vss potential so transistors 224 and 26 are substantially non-conductive. Because transistors 218, 220, 222, 224, 32, and 34 of bias circuit 30 are non-conductive, their currents are reduced to leakage levels.

During a low power mode, disable signal DISABLE is negated as a logic low causing transistor 28 to be substantially non-conductive. Leakage current labeled "I" in FIG. 2 will cause the voltage at node N3 to increase. Transistors 220, 222, and 224 provide a feedback path from node N1 to node N2. Generally, the gate of sensing transistor 218 is coupled to sense the voltage at node N3. When transistor 218 responds to the increasing voltage, the feedback path controls the voltage at the control electrode of regulating transistor 26 to maintain the voltage at node N3 at a predetermined voltage level. The body terminal of transistor 218 is connected to node N3 so that an increasing voltage at node N3 lowers the threshold voltage (VT) of transistor 218. Lowering the VT in this manner improves the conductivity of the transistor 218 without increasing the size of transistor 218. More specifically, during low power mode, the increasing voltage at node N3 will cause transistor 218 to start to become conductive, decreasing the voltage at node N1. The decreasing voltage at node N1 will bias transistors 220 and 222 to start to become conductive. When transistor 222 becomes conductive, the voltage at node N2 will increase. The increasing voltage at node N2 will cause transistor 26 to be conductive and reduce the voltage at node N3. Thus, regulating transistor 26 will maintain the voltage at node N3 at the predetermined voltage level above VSS.

Note that transistors 32, 34, 36, and 38 are used to determine the predetermined voltage at which node N3 is maintained. In one embodiment, as seen in reference to the table of FIG. 3, when disable signal DISABLE is negated (a logic level 0) and float signal FLOAT is also negated (a logic level 0), sel0 and sel1 are used to set the value of the predetermined voltage at which node N3 is maintained. For example, when sel0 is a logic level 0 and sel1 is a logic level 0, as in row 1 of FIG. 3, transistors 36 and 38 are non-conductive and node N3 (and thus Vss_reg) is maintained at 300 mV. When sel0 is a logic level 0 and sel1 1 a logic level 1, as in row 2 of FIG. 3, transistor 36 is non-conductive and transistor 38 is conductive and node N3 (and thus Vss_reg) is maintained at 200 mV. When sel0 is a logic level 1 and sel1 is a logic level 1, as in row 3 of FIG. 3, transistors 36 and 38 are conductive and node N3 (and thus Vss_reg) is maintained at 100 mV. Therefore, any number of transistor fingers, such as transistors 32 and 34 and transistors 36 and 38 can be used in voltage regulator 20 to provide a desired number of possible values for Vss_reg, as needed to implement the desired voltage scaling options. For row 4 of FIG. 3, disable signal DISABLE is asserted to a logic high which connects node N3 to Vss, thus setting Vss_reg to 0V. For row 5 of FIG. 3, float signal FLOAT is asserted to a logic high thus making transistor 40 non-conductive. In this case, node N3 is left to float. Therefore, by way of the drowsy select signal from power management unit 12, values for DISABLE, FLOAT, sel0, and sel1 can be provided to drowsy voltage regulator 20 based on which of the low power modes of FIG. 3 is indicated to power management unit 12.

In one embodiment, the table of FIG. 3 can be stored as a look-up table within power management unit 12 or elsewhere within data processing system 10. Furthermore, more or fewer modes may be included in the table. If more modes are included, then additional select signals, such as sel0 and sel1, may be included as needed to indicate to drowsy voltage regulator 20 the appropriate regulated voltage for Vss_reg. If more modes are included, then voltage regulator 20 can be modified, as needed, to allow for more values for Vss_reg.

Therefore, by way of commands from, for example, processor 18 to power management unit 12, transitions can be made between low power modes in which the voltage difference between Vdd_reg and Vss_reg in low power modes 1-4 are sufficient to maintain state of memory 16. However, such transitions are performed in a particular manner such that state is not lost during the transitioning itself, as will be described further in reference to FIGS. 4 and 5.

Figure 4:
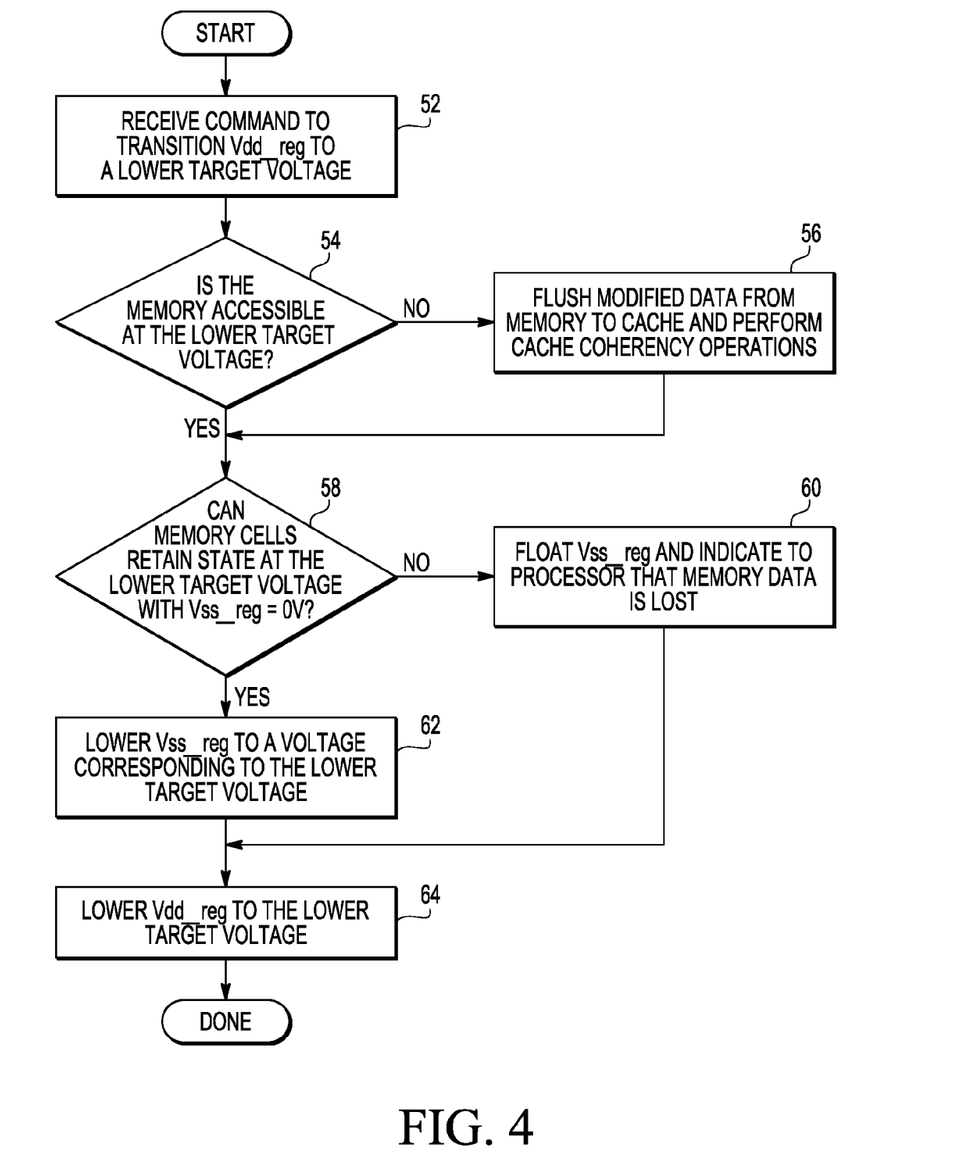
FIG. 4 illustrates a flow chart of a method for transitioning to a lower power mode of the data processing system of FIG. 1.

FIG. 4 indicates, in flow diagram form, a method for transitioning to a lower power supply voltage in accordance with one embodiment of the present invention. The flow diagram of FIG. 4 begins with block 52 in which a command is received to transition Vdd_reg to a lower target voltage. For example, this command may be sent by processor 18 to power management unit 12. Alternatively, power management unit 12 may itself command the transition to the lower target voltage. In one embodiment, part of this command includes indicating the desired lower target voltage. In one embodiment, the table of FIG. 3 provides predetermined possible target voltages, and one of the low power modes having a lower target voltage for Vdd_reg is selected by the received command. Also, the example of values provided in FIG. 3 also assumes that the minimum data retention voltage for memory 16 is 0.7V.

For example, if data processing system 10 is currently operating in low power mode 1, Vdd_reg is at 1.0V and Vss_reg is at 300 mV. A command to transition to low power mode 2 may be received in which Vdd_reg is to be transitioned to 0.9V (as seen in row 2 of FIG. 3). Therefore, note that processor 18, after the transition, will receive a power supply voltage of 0.9V, which is lower than the power supply voltage of 1.0V received by processor 18 prior to the transition. As described above, both Vdd_reg and Vss_reg receive variable potentials as provided by regulators 14 and 20, respectively. When a transition to low power mode 2 from low power mode 1 is commanded, Vss_reg is also transitioned, from 300 mV to 200 mV. Therefore, memory 16, after the transition, will receive a power supply voltage of 0.7V, just as it was receiving prior to the transition. In one embodiment, the initial difference (prior to the transition) between Vdd_reg and Vss_reg, seen by memory 16, is not less than a minimum data retention voltage (e.g. 0.7V) of memory 16 and is also the same as the difference between Vdd_reg and Vss_reg after completion of the transition. In this manner, memory 16 is able to maintain its state while allowing for the possibility to reduce leakage currents. During the transition, though, if Vdd_reg is transitioned to 0.9V prior to transitioning Vss_reg to 200 mV (meaning that Vss_reg is still at 300 mV), the power supply voltage seen by memory 16 momentarily falls from 0.7V to 0.6V, which, in the current example, is less than the minimum data retention voltage of 0.7V. In this situation, the data in memory 16 may be compromised or lost. Therefore, as will be seen in reference to blocks 62 and 64 below, Vss_reg is transitioned prior to Vdd_reg in response to the received command such that at least the minimum data retention voltage is maintained over memory 16.

Referring back to FIG. 4, after block 52, flow proceeds to decision diamond 54 in which it is determined whether the memory is accessible at the lower target voltage. That is, it is determined whether the target value for Vdd_reg minus the corresponding value for Vss is at least as great as a minimum voltage required to be able to access (i.e. read, write, or read and write) memory 16. During a read or write access to memory 16, Vss_reg is lowered to the Vss voltage level since the minimum voltage required to access the memory is greater than the minimum voltage required to retain state. For example, while the minimum retention voltage maybe 0.7V, the minimum access voltage maybe 0.8V. After the memory access is complete, Vss_reg is allowed to drift back up from Vss to the target Vss_reg voltage. In the example provided above of transitioning from low power mode 1 to low power mode 2, memory 16 would still be accessible at the 0.9V access voltage (0.9V, the target voltage, minus 0V, the corresponding value for Vss). In this case flow proceeds to decision diamond 58.

At decision diamond 58, it is determined whether the memory cells can retain state at the lower target voltage assuming that Vss_reg is 0V (i.e., assuming that voltage regulator 20 is disabled, such as by asserting disable signal DISABLE to a logic high as seen in FIG. 2). In the alternate embodiment of FIG. 1 where drowsy voltage regulator 20 provides a regulated voltage Vdd_mem to memory 16, it is determined whether the memory cells can retain state at the lower target voltage assuming that Vdd_mem equals Vdd_reg (i.e. drowsy voltage regulator 20 is disabled). If not, then flow proceeds to block 60. That is, even with Vss_reg being at its lowest possible voltage (which is 0V in the current embodiment), data cannot be maintained in memory 16. Therefore, flow proceeds to block 60 in which Vss_reg is allowed to float. In one embodiment, Vss_reg is allowed to float by asserting the float signal FLOAT shown in FIG. 2 (this signal may be asserted, for example, by power management unit 12). In this manner, leakage currents can be reduced. The data is lost when Vss_reg is allowed to float; however, even with keeping Vss_reg at 0V in this situation, memory 16 would not be able to retain its data anyway. Also, when Vss_reg is floated, an indication may be provided, such as by power management unit 12 or memory 16 to processor 18, that the data in memory 16 is lost. After block 60, flow proceeds to block 64.

Referring back to decision diamond 58, if the memory cells of memory 16 can retain state at the lower target voltage even with Vss_reg set at 0V, then flow proceeds to block 62 in which Vss_reg is lowered to a voltage corresponding to the lower target voltage. Therefore, in the current example in which low power mode 1 is being transitioned to low power mode 2, the voltage for Vss_reg corresponding to the lower target voltage of 0.9V for Vdd_reg is 200 mV. Therefore, Vss_reg is transitioned from 300 mV to 200 mV. This may be done, for example, by power management unit 12 appropriately selecting the second row of FIG. 3 and providing the drowsy voltage select signal according to the values provided in the second row of FIG. 3 for DISABLE, FLOAT, Sel1, and Sel0. Therefore, power management unit 12 may provide a 4-bit value of 0b0001 to drowsy voltage regulator 20 such that Vss_reg is regulated to 200 mV rather than 300 mV.

After block 62, flow proceeds to block 64 in which Vdd_reg is lowered to the lower target voltage. That is, after Vss_reg is lowered, then Vdd_reg can be lowered. This ordering ensures that the voltage across memory 16 does not fall below the minimum data retention voltage. Therefore, in the current example in which low power mode 1 is being transitioned to low power mode 2, Vss_reg is first lowered to 200 mV from 300 mV prior to lowering Vdd_reg to 0.9 V from 1.0V. Therefore, in one embodiment, after power management unit 12 provides the drowsy voltage select signal to indicate low power mode 2 to drowsy voltage regulator 20 such that drowsy voltage regulator 20 can regulate Vss_reg to the new value, power management unit 12 can then provide the regulated voltage select signal to voltage regulator 14 to indicate the new selected value for Vdd_reg. In this manner, Vss_reg is transitioned or changed prior to the transitioning or changing of Vdd_reg. In the case where block 64 is entered from block 60, note that Vss_reg is allowed to float and then Vdd_reg is lowered to the lower target voltage. However, note that Vss_reg may be allowed to float prior to, after, or at the same time as lowering Vdd_reg since the data in memory 16 will be lost regardless.

Referring back to decision diamond 54, if memory 16 is not accessible at the lower target voltage, then flow proceeds to block 56. For block 56, it is assumed that memory 16 is a cache memory (such as an L1 cache for processor 18) and that data processing system 10 includes one or more higher level caches (such as an L2, L3, etc. cache). In this case, cache coherency needs to be maintained, so if memory 16 is not going to be accessible at the lower target voltage, then the modified data from memory 16 is flushed to another cache, such as a higher level cache. In this manner, other masters wishing to access that modified data may continue to do so from the other cache and not need to access memory 16 (which would no longer be accessible). Also, other cache coherency operations may be performed as well in order to maintain cache coherency. Also, in alternate embodiments, memory 16 may not be a cache but may be another type of memory or storage circuitry. In this case, in block 56, processor 18 or some other module in data processing system 10 may simply be notified that memory 16 is no longer accessible, or some other manipulation of data of memory 16 may be done instead. Alternatively, nothing may be done, meaning that decision diamond 54 and block 56 may be removed from the flow of FIG. 4 such that flow proceeds from block 52 to decision diamond 58.

In the alternate embodiment of FIG. 1 where drowsy voltage regulator 20 provides a regulated voltage Vdd_mem to memory 16, Vdd_mem must also be transitioned prior to Vdd_reg in response to the received command so that at least the minimum data retention voltage is maintained across the memory. For example, in an analogous low power mode 1, Vdd_reg is at 1.0V and Vdd_mem is at 0.7V (the voltage difference corresponding to the Vss_reg value in the table of FIG. 3). A command to transition to a low power mode 2 may be received in which Vdd_reg is to be transitioned to 0.9V corresponding to row 2 of FIG. 3. When a transition to low power mode 2 from low power mode 1 is commanded, the operation of drowsy voltage regulator 20 is modified via the drowsy voltage select signals so that the voltage drop from Vdd_reg to Vdd_mem is decreased from 300 mV to 200 mV. After Vdd_mem increases from 0.7V to 0.8V, Vdd_reg is transitioned from 1V to 0.9V. After the transition, Vdd_mem will be at 0.7V just as it was prior to the transition since drowsy voltage regulator 20 provides a 200 mV drop from Vdd_reg. Had Vdd_mem not been increased prior to lowering Vdd_reg to 0.9V, data would have been lost since the power supply voltage seen by memory 16 momentarily falls from 0.7V to 0.6V, which is less than the minimum data retention voltage of 0.7V. Therefore, the flow diagram of FIG. 4 can be modified for this alternate embodiment such that Vdd_mem would be raised in block 62, prior to lowering Vdd_reg in block 64, so that at least a minimum retention voltage is maintained over memory 16.

Figure 5:
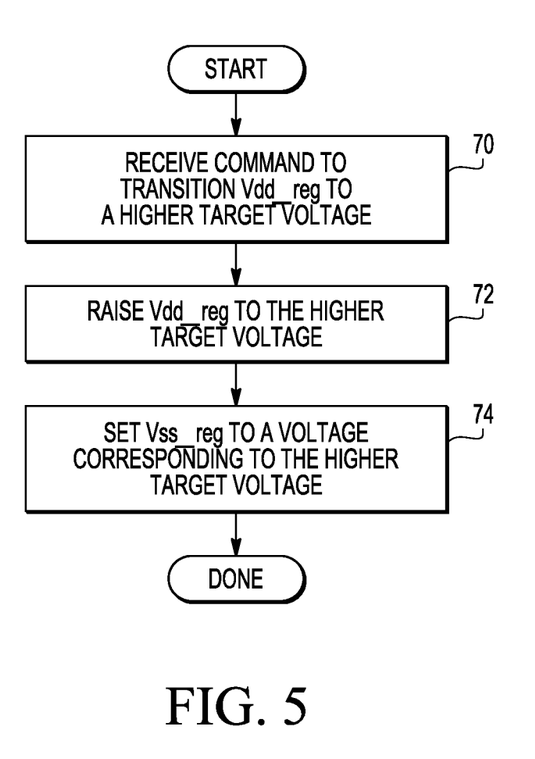
FIG. 5 illustrates a flow chart of a method for transitioning from a lower power mode of the data processing system of FIG. 1.

FIG. 5 illustrates, in flow diagram form, a method for transitioning to a higher power supply voltage in accordance with one embodiment of the present invention. The flow of FIG. 5 begins with block 70 in which a command is received to transition Vdd_reg to a higher target voltage. For example, this command may be sent by processor 18 to power management unit 12. Alternatively, power management unit 12 may itself command the transition to the higher target voltage. In one embodiment, part of this command includes indicating the desired higher target voltage. In one embodiment, the table of FIG. 3 provides the predetermined possible target voltages, and one of the low power modes having a higher target voltage for Vdd_reg is selected by the received command of block 70. For example, after the transition to low power mode 2, a command can be received in block 70 to transition back to low power mode 1. Again, for FIG. 5, it is assumed that the minimum data retention voltage for memory 16 is 0.7V.

After block 70, flow proceeds to block 72 in which Vdd_reg is raised to the higher target voltage. For example, power management unit 12 may provide regulated voltage select signal to voltage regulator 14 such that Vdd_reg can be changed to the higher target voltage. In the example provided above in which lower power mode 2 is transitioned back to low power mode 1, Vdd_reg is transitioned from 0.9V back to 1.0V.

Flow then proceeds to block 74 in which Vss_reg is set to a voltage corresponding to the higher target voltage. That is, in order to ensure that the minimum data retention voltage of memory 16 is maintained, Vss_reg is not transitioned to the higher voltage until Vdd_reg is first transitioned to the higher target voltage. Therefore, in the current example, after Vdd_reg is transitioned from 0.9V to 1.0V, Vss_reg is transitioned from 200 mV back to 300 mV. For example, after Vdd_reg is transitioned, power management unit 12 may provide the appropriate values for drowsy voltage select signal to drowsy voltage regulator 20 to allow Vss_reg to transition.

In the alternate embodiment of FIG. 1 where drowsy voltage regulator 20 provides a regulated voltage Vdd_mem to memory 16, Vdd_mem would be lowered at block 74 after raising Vdd_reg at block 72. For example, while in low power mode 2 where Vdd_reg is 0.9V and Vdd_mem is 0.7V, since voltage regulator 20 is configured to provide a 200 mV voltage drop, a command is received to switch to low power mode 1. Vdd_reg is first transitioned to 1V causing Vdd_mem to rise to 0.9V. After raising Vdd_reg, drowsy voltage regulator 20 is configured to provide a 300 mV voltage drop causing Vdd_mem to lower to 0.7V, the voltage across memory 16 prior to transitioning Vdd_reg to the higher target voltage. By ordering the voltage transitions in this manner, at least a retention voltage is maintained across memory 16.

Although the examples provided above transition between low power modes provided in adjacent rows of FIG. 3, the commands to transition between low power modes can be between any of the low power modes. For example, a transition can be commanded from low power mode 1 to low power mode 3 and then back to low power mode 2. However, in a transition to a lower target voltage in which the state of the memory can still be retained, the potential at the Vss_reg power supply terminal is transitioned prior to transitioning the potential at the Vdd_reg power supply terminal, and in a transition to a higher target voltage, the potential at the Vdd_reg power supply terminal is transitioned prior to transitioning the potential at the Vss_reg power supply terminal.

Note that, in one embodiment, when Vdd_reg is scaled, the power supply voltage seen by processor 18 prior to and after the transition is different. However, since Vss_reg is also capable of providing a variable potential like Vdd_reg, the power supply voltage seen by memory 16 prior to and after the transition is the same. However, during the transitioning of Vdd_reg and Vss_reg, note that the stability of the memory cells of memory 16 may temporarily change. For example, in the case of transitioning to a lower Vdd_reg and Vss_reg, the stability of the memory cells may be increased at the point in which Vss_reg is lowered prior to lowering Vdd_reg (since the power supply voltage seen by memory 16 is increased). Once the transition of Vdd_reg is completed, though, the stability of the memory cells return to what it was prior to the transitioning. Therefore, the increase in stability may only be temporary.

Therefore, by now it can be appreciated how a data processing system capable of varying a potential received at a first power supply voltage terminal, such as by using a dynamic voltage scaling method to reduce power consumption, and capable of varying a potential received at a second power supply voltage terminal coupled to a memory in order to reduce leakage current of the memory can be implemented while maintaining the ability to retain state in the memory. For example, in the case of scaling down the potential at the first power supply voltage terminal, the potential at the second power supply voltage terminal (which is coupled to the memory) is first scaled down prior to scaling down the potential at the first power supply voltage terminal. In one embodiment, each possible value for the first power supply voltage terminal is provided in a look-up table with a corresponding value for the second power supply voltage terminal. In this manner, both the first and second power supply voltage terminals are capable of having a variable potential and capable of being safely transitioned without loss of data in the memory. Therefore, in one embodiment, the strength of the bitcell is increased prior to transitioning to a lower voltage and the strength of the bitcell is decreased after transitioning to a higher voltage. While in this embodiment the strength of the bitcell is increased by increasing the voltage across the bitcell, there are other ways of increasing bitcell stability, such as manipulating bitcell transistor threshold voltages or modulating bitcell transistor width by enabling and disabling bitcell transistor fingers in parallel.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary data processor, this exemplary processor is presented merely to provide a useful reference in discussing various aspects of the invention. Of course, the description of the processor has been simplified for purposes of discussion, and it is just one of many different types of appropriate processors that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method for operating a data processing system having a memory, the memory coupled between a first power supply voltage terminal and a second power supply voltage terminal, the first power supply voltage terminal for receiving a first variable potential and the second power supply voltage terminal for receiving a second variable potential, wherein an initial difference between the first variable potential and the second variable potential is not less than a first voltage. The method includes receiving a command to transition the data processing system from a first power supply voltage to a second power supply voltage; changing the second variable potential so that a difference between the second variable potential and the first variable potential is greater than the first voltage; and after changing the second variable potential, changing the first variable potential, wherein a difference between the first variable potential and the second variable potential is not less than the first voltage. Item 2 includes the method of item 1 and further includes determining that a plurality of memory cells in the memory can retain a predetermined logic state at a lower power supply voltage before changing the second variable potential. Item 3 includes the method of item 1, wherein the first voltage is not less than a minimum data retention voltage of the memory. Item 4 includes the method of item 1, wherein the first power supply voltage is greater than the second power supply voltage, wherein changing the second variable potential further comprises decreasing the second variable potential; and wherein changing the first variable potential further comprises decreasing the first variable potential. Item 5 includes the method of item 4, and further includes receiving a command to transition the data processing system from the second power supply voltage to the first power supply voltage; increasing the first variable potential; and after increasing the first variable potential, increasing the second variable potential. Item 6 includes the method of item 4, and further includes prior to decreasing the second variable potential, determining that the memory will not be accessible after the transition; flushing modified data from the memory to a second memory; and performing coherency operations on the memory. Item 7 includes the method of item 1, wherein the memory is characterized as being a static random access memory. Item 8 includes the method of item 1, and further includes selecting the first variable potential and the second variable potential from a look-up table.

Item 9 includes a method in a data processing system having a processor and a memory, the processor coupled between a first power supply voltage terminal and a second power supply voltage terminal, the processor for receiving a first power supply voltage, and the memory coupled between the first power supply voltage terminal and a third power supply voltage terminal, the memory for receiving a second power supply voltage. The method includes receiving a command to lower the first and the second power supply voltages; determining that the memory can retain a stored logic state at the lower second power supply voltage; decreasing a potential at the third power supply voltage terminal; and decreasing a potential at the first power supply voltage terminal after decreasing the potential at the third power supply voltage terminal. Item 10 includes the method of item 9, and further includes receiving a command to increase the first and second power supply voltages; increasing a potential at the first power supply voltage terminal; and increasing a potential at the third power supply voltage terminal after increasing the potential at the first power supply voltage terminal. Item 11 includes the method of item 9, and further includes prior to decreasing the potential at the third power supply voltage terminal, determining that the memory will not be accessible at the lower second power supply voltage; flushing modified data from the memory to a second memory; and performing coherency operations on the second memory. Item 12 includes the method of item 9, and further includes selecting the first and second power supply voltages from a look-up table. Item 13 includes the method of item 9, wherein decreasing a potential at the third power supply voltage terminal and decreasing a potential at the first power supply voltage terminal further comprises decreasing the potentials at both the first and the third power supply voltage terminal substantially equally. Item 14 includes the method of item 9, wherein the memory is characterized as being a static random access memory. Item 15 includes the method of item 9, wherein the second power supply voltage is not less than a minimum data retention voltage of the memory.

Item 16 includes a data processing system including a first power supply terminal; a second power supply terminal; a first voltage regulator coupled to the first power supply terminal for receiving a first power supply voltage, and for providing a first regulated power supply voltage having a plurality of first predetermined voltage levels; a second voltage regulator coupled to the second power supply voltage terminal, for providing a second regulated power supply voltage having a plurality of second predetermined voltage levels; a memory coupled to the first and second power supply voltage terminals; and a power management unit coupled to the first and second voltage regulators, the power management unit for selecting one of the plurality of first predetermined voltage levels and for selecting one of the plurality of second predetermined voltage levels, wherein in response to a command to transition the memory to a different power supply voltage, the power management unit selecting one of the plurality of second predetermined voltage levels before selecting one of the plurality of first predetermined voltage levels. Item 17 includes the data processing system of item 16, wherein the plurality of first predetermined voltage levels and the plurality of second predetermined voltage levels are stored as a look-up table. Item 18 includes the data processing system of item 16, wherein each of the first predetermined voltage levels is greater than each of the second predetermined voltage levels. Item 19 includes the data processing system of item 16, and further includes a processor coupled to the first power supply voltage terminal and to a third power supply voltage terminal, wherein in the third power supply voltage terminal is at ground potential. Item 20 includes the data processing system of item 16, wherein the memory comprises a plurality of static random access memory cells, and wherein each of the plurality of memory cells is coupled to the first and second power supply voltage terminals.

What is claimed is:

1. A method for operating a data processing system having a memory, the memory coupled between a first power supply voltage terminal and a second power supply voltage terminal, the first power supply voltage terminal for receiving a first variable potential and the second power supply voltage terminal for receiving a second variable potential, wherein an initial difference between the first variable potential and the second variable potential is not less than a first voltage, the method comprising:
   receiving a command to transition the data processing system from a first power supply voltage to a second power supply voltage;
   changing the second variable potential so that a difference between the second variable potential and the first variable potential is greater than the first voltage; and
   after changing the second variable potential, changing the first variable potential, wherein a difference between the first variable potential and the second variable potential is not less than the first voltage.

2. The method of claim 1, further comprising determining that a plurality of memory cells in the memory can retain a predetermined logic state at a lower power supply voltage before changing the second variable potential.

3. The method of claim 1, wherein the first voltage is not less than a minimum data retention voltage of the memory.

4. The method of claim 1, wherein the first power supply voltage is greater than the second power supply voltage, wherein changing the second variable potential further comprises decreasing the second variable potential; and wherein changing the first variable potential further comprises decreasing the first variable potential.

5. The method of claim 4, further comprising:
   receiving a command to transition the data processing system from the second power supply voltage to the first power supply voltage;
   increasing the first variable potential; and
   after increasing the first variable potential, increasing the second variable potential.

6. The method of claim 4, further comprising:
   prior to decreasing the second variable potential, determining that the memory will not be accessible after the transition;
   flushing modified data from the memory to a second memory; and
   performing coherency operations on the memory.

7. The method of claim 1, wherein the memory is characterized as being a static random access memory.

8. The method of claim 1, further comprising selecting the first variable potential and the second variable potential from a look-up table.

9. In a data processing system having a processor and a memory, the processor coupled between a first power supply voltage terminal and a second power supply voltage terminal, the processor for receiving a first power supply voltage, and the memory coupled between the first power supply voltage terminal and a third power supply voltage terminal, the memory for receiving a second power supply voltage, a method comprising:
   receiving a command to lower the first and the second power supply voltages;
   determining that the memory can retain a stored logic state at the lower second power supply voltage;
   decreasing a potential at the third power supply voltage terminal; and
   decreasing a potential at the first power supply voltage terminal after decreasing the potential at the third power supply voltage terminal.

10. The method of claim 9, further comprising:
   receiving a command to increase the first and second power supply voltages;
   increasing a potential at the first power supply voltage terminal; and
   increasing a potential at the third power supply voltage terminal after increasing the potential at the first power supply voltage terminal.

11. The method of claim 9, further comprising:
   prior to decreasing the potential at the third power supply voltage terminal, determining that the memory will not be accessible at the lower second power supply voltage;
   flushing modified data from the memory to a second memory; and
   performing coherency operations on the second memory.

12. The method of claim 9, further comprising selecting the first and second power supply voltages from a look-up table.

13. The method of claim 9, wherein decreasing a potential at the third power supply voltage terminal and decreasing a potential at the first power supply voltage terminal further comprises decreasing the potentials at both the first and the third power supply voltage terminal substantially equally.

14. The method of claim 9, wherein the memory is characterized as being a static random access memory.

15. The method of claim 9, wherein the second power supply voltage is not less than a minimum data retention voltage of the memory.

16. A data processing system comprising:
a first power supply terminal;
a second power supply terminal;
a first voltage regulator coupled to the first power supply terminal for receiving a first power supply voltage, and for providing a first regulated power supply voltage having a plurality of first predetermined voltage levels;
a second voltage regulator coupled to the second power supply voltage terminal, for providing a second regulated power supply voltage having a plurality of second predetermined voltage levels;
a memory coupled to the first and second power supply voltage terminals; and
a power management unit coupled to the first and second voltage regulators, the power management unit for selecting one of the plurality of first predetermined voltage levels and for selecting one of the plurality of second predetermined voltage levels, wherein in response to a command to transition the memory to a different power supply voltage, the power management unit selecting one of the plurality of second predetermined voltage levels before selecting one of the plurality of first predetermined voltage levels.

17. The data processing system of claim 16, wherein the plurality of first predetermined voltage levels and the plurality of second predetermined voltage levels are stored as a look-up table.

18. The data processing system of claim 16, wherein each of the first predetermined voltage levels is greater than each of the second predetermined voltage levels.

19. The data processing system of claim 16, further comprising a processor coupled to the first power supply voltage terminal and to a third power supply voltage terminal, wherein in the third power supply voltage terminal is at ground potential.

20. The data processing system of claim 16, wherein the memory comprises a plurality of static random access memory cells, and wherein each of the plurality of memory cells is coupled to the first and second power supply voltage terminals.

* * * * *